(12) United States Patent
Finn et al.

(10) Patent No.: US 11,677,833 B2
(45) Date of Patent: Jun. 13, 2023

(54) METHODS FOR VISUALIZING AND INTERACTING WITH A THREE DIMENSIONAL OBJECT IN A COLLABORATIVE AUGMENTED REALITY ENVIRONMENT AND APPARATUSES THEREOF

(71) Applicant: Kaon Interactive, Maynard, MA (US)

(72) Inventors: Gavin Finn, Framingham, MA (US); Joshua Smith, Barre, MA (US); Anatoly Dedkov, Maynard, MA (US)

(73) Assignee: KAON INTERACTIVE, Maynard, MA (US)

( * ) Notice: Subject to any disclaimer, the term of this patent is extended or adjusted under 35 U.S.C. 154(b) by 30 days.

(21) Appl. No.: 16/415,446

(22) Filed: May 17, 2019

(65) Prior Publication Data

US 2019/0356758 A1 Nov. 21, 2019

Related U.S. Application Data

(60) Provisional application No. 62/672,780, filed on May 17, 2018.

(51) Int. Cl.
*H04L 67/131* (2022.01)
*G06T 19/00* (2011.01)
*G06F 3/01* (2006.01)
*G06T 19/20* (2011.01)

(52) U.S. Cl.
CPC ............ *H04L 67/131* (2022.05); *G06F 3/011* (2013.01); *G06T 19/003* (2013.01); *G06T 19/006* (2013.01); *G06T 19/20* (2013.01)

(58) Field of Classification Search
CPC ....................................................... H04L 67/38
See application file for complete search history.

(56) References Cited

U.S. PATENT DOCUMENTS

| 2008/0012863 A1 | 1/2008 | Finn et al. |
| 2013/0194304 A1* | 8/2013 | Latta ............... G09G 3/003 345/633 |

(Continued)

OTHER PUBLICATIONS

International Search Report and Written Opinion for PCT/US2019/032859, dated Aug. 2, 2019, pp. 1-10.

*Primary Examiner* — Nicholas P Celani
(74) *Attorney, Agent, or Firm* — Troutman Pepper Hamilton Sanders LLP (Rochester)

(57) ABSTRACT

Methods, non-transitory computer readable media, and collaborative computing apparatus that establish a collaborative session for visualizing and interacting with a three-dimensional object in a collaborative augmented reality environment between two or more of a plurality of computing devices. Position and orientation information of each of the two or more of the plurality of computing devices is obtained. An interaction instruction with respect to the three-dimensional object from a first of the two or more of the plurality of computing devices is received. Instructions for adjusting visualization of the three-dimensional object on each of the other of the two or more of the plurality of computing devices are determined and provided based on the received interaction instruction and the obtained position and orientation information of each of the two or more of the plurality of computing devices.

18 Claims, 5 Drawing Sheets

(56) References Cited

U.S. PATENT DOCUMENTS

| | | | |
|---|---|---|---|
| 2013/0201291 A1* | 8/2013 | Liu | G06F 3/012 |
| | | | 348/47 |
| 2013/0307874 A1 | 11/2013 | Blanchflower et al. | |
| 2014/0368532 A1* | 12/2014 | Keane | G06F 3/012 |
| | | | 345/619 |
| 2015/0070274 A1* | 3/2015 | Morozov | G02B 27/017 |
| | | | 345/156 |
| 2015/0100463 A1* | 4/2015 | Drazin | G06Q 30/0641 |
| | | | 705/27.1 |
| 2015/0279106 A1* | 10/2015 | Blanchflower | A63F 13/65 |
| | | | 345/2.2 |
| 2016/0321841 A1* | 11/2016 | Christen | G02B 27/017 |

* cited by examiner

METHODS FOR VISUALIZING AND INTERACTING WITH A THREE DIMENSIONAL OBJECT IN A COLLABORATIVE AUGMENTED REALITY ENVIRONMENT AND APPARATUSES THEREOF

This application claims the benefit of Provisional Patent Application Ser. No. 62/672,780 filed May 17, 2018, which is hereby incorporated by reference in its entirety.

FIELD

This technology relates to methods, non-transitory computer readable medium and devices for visualizing and interacting with a three dimensional object in a collaborative augmented reality environment and apparatuses thereof.

BACKGROUND

Currently, in order to better understand how products and systems are operated, serviced, used, installed, and maintained, the typical method is for companies to show people how to accomplish these tasks using the physical equipment. This is very expensive and restrictive particularly for large, complex products, because of limited access to physical space and also complexities of arranging the logistics for many people to be in the same place at the same time. A better method is to use software systems instead of working with the physical products themselves. Software-based systems allow people to learn what they need to know about the physical product from any location, and at any time, without having to have the physical systems present.

Unfortunately, the current state of the art for these software based systems provides a less-than-realistic perspective for these users, and so the process of learning about these products is less effective than it needs to be. Further, the current software based systems lack the fundamental capability to visualize and interact with a product in a shared environment so that multiple people can participate in the learning experience simultaneously, which is the ideal objective.

SUMMARY

A method for managing a collaborative session for visualizing and interacting with a three-dimensional object in a collaborative augmented reality environment includes establishing, by a computing apparatus, a collaborative session for visualizing and interacting with a three-dimensional object in a collaborative augmented reality environment between two or more of a plurality of computing devices. Position and orientation information of each of the two or more of the plurality of computing devices is obtained, by the computing apparatus. An interaction instruction with respect to the three-dimensional object from a first of the two or more of the plurality of computing devices is received, by the computing apparatus. One or more instructions for adjusting visualization of the three-dimensional object on each of the other of the two or more of the plurality of computing devices are determined and provided, by the computing apparatus, based on the received interaction instruction and the obtained position and orientation information of each of the two or more of the plurality of computing devices.

An augmented reality collaborative computing apparatus, comprising memory comprising programmed instructions stored thereon and one or more processors configured to be capable of executing the stored programmed instructions to establish a collaborative session for visualizing and interacting with a three-dimensional object in a collaborative augmented reality environment between two or more of a plurality of computing devices. Position and orientation information of each of the two or more of the plurality of computing devices is obtained. An interaction instruction with respect to the three-dimensional object from a first of the two or more of the plurality of computing devices is received. One or more instructions for adjusting visualization of the three-dimensional object on each of the other of the two or more of the plurality of computing devices are determined and provided based on the received interaction instruction and the obtained position and orientation information of each of the two or more of the plurality of computing devices.

A non-transitory computer readable medium having stored thereon instructions comprising executable code which when executed by one or more processors, causes the one or more processors to establish a collaborative session for visualizing and interacting with a three-dimensional object in a collaborative augmented reality environment between two or more of a plurality of computing devices. Position and orientation information of each of the two or more of the plurality of computing devices is obtained. An interaction instruction with respect to the three-dimensional object from a first of the two or more of the plurality of computing devices is received. One or more instructions for adjusting visualization of the three-dimensional object on each of the other of the two or more of the plurality of computing devices are determined and provided based on the received interaction instruction and the obtained position and orientation information of each of the two or more of the plurality of computing devices.

This technology provides a number of advantages including providing methods, non-transitory computer readable medium and devices for visualizing and interacting with digital objects in a collaborative augmented reality environment. With this technology, multiple participants of a session collaboratively visualize and interact with digital three-dimensional (3D) versions of physical products in an augmented reality view of the same real-world space. Further, this technology advantageously provides an improved collaborative session where multiple participants can provide their input interactively in real time over a 3D object. Further, this technology provides multiple participants to understand how a product(s) would look like in that physical space, and to learn about any aspect of the product(s) related to functionality, service, maintenance, operation, and technical/business value while all of the people were collaboratively interacting with in an augmented reality environment. This technology further improves users understanding of new products as the collaboration allows for instruction and dialogue to better inform the users, and the interaction develops an intellectual and emotional connection to the learning process that results in better memory retention.

DETAILED DESCRIPTION

Figure 1:
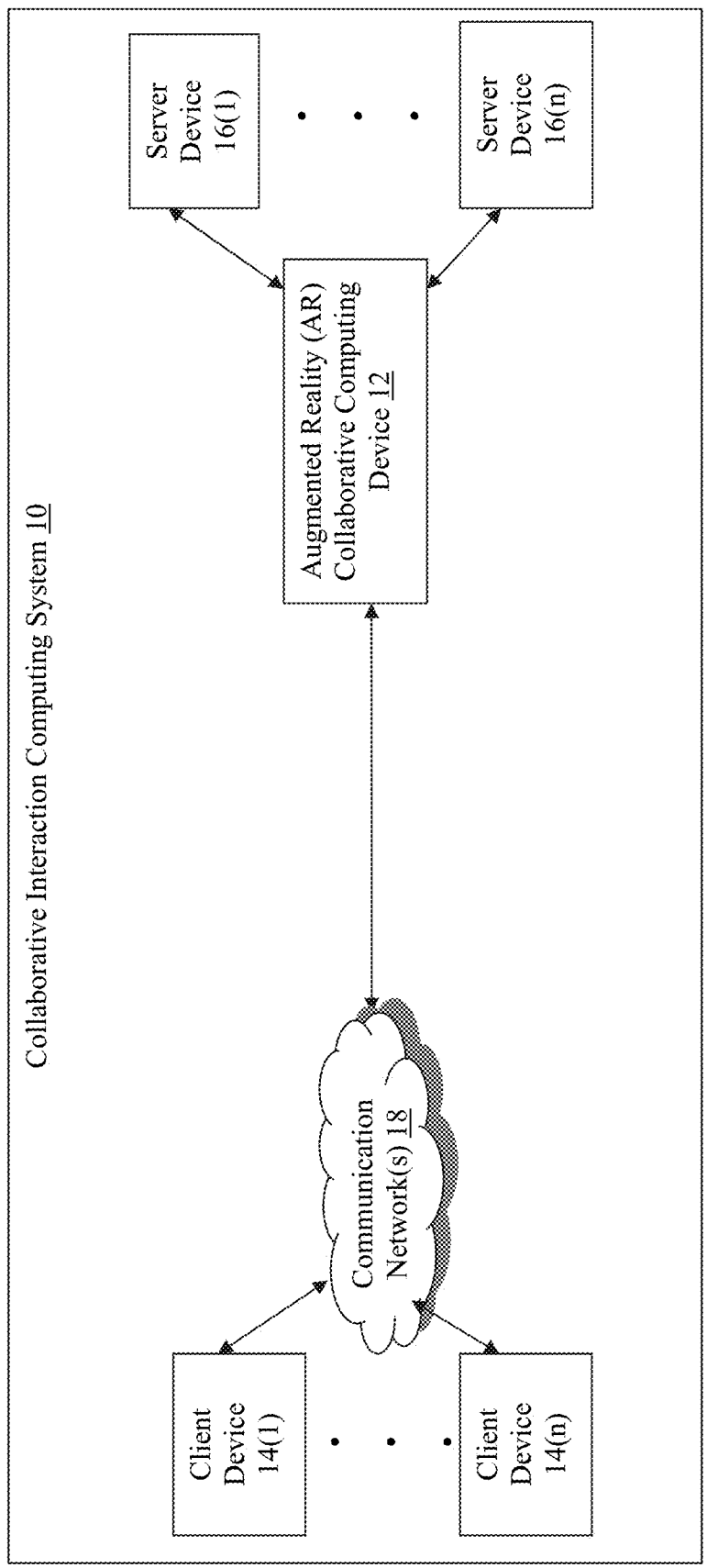
FIG. 1 is a block diagram of an environment with an example of collaborative interaction computing system with an augmented reality collaborative computing device.

An exemplary environment which incorporates an example of a collaborative interaction computing system 10 is illustrated in FIG. 1. In this example, the collaborative interaction computing system 10 includes an augmented reality collaborative computing apparatus 12 that is coupled to a plurality of client devices 14(1)-14(n) and to a plurality of server devices 16(1)-16(n) via one or more communication network(s) 18, although the augmented reality collaborative interaction computing device 12, client devices 14(1)-14(n), and/or server devices 16(1)-16(n) may be coupled together via other topologies. Additionally, the collaborative interaction computing system 10 may include other network devices such as one or more routers and/or switches, for example, which are well known in the art and thus will not be described herein. This technology provides a number of advantages including methods, non-transitory computer readable media, and augmented reality collaborative interaction computing devices that provide an optimized augmented reality (AR) environment that displays a three dimensional (3D) object model across multiple client devices simultaneously for viewing and manipulation. Each of the client devices engaged with the project advantageously will present a unique view of the 3D object model corresponding to the client devices current orientation in real time.

Figure 2A:
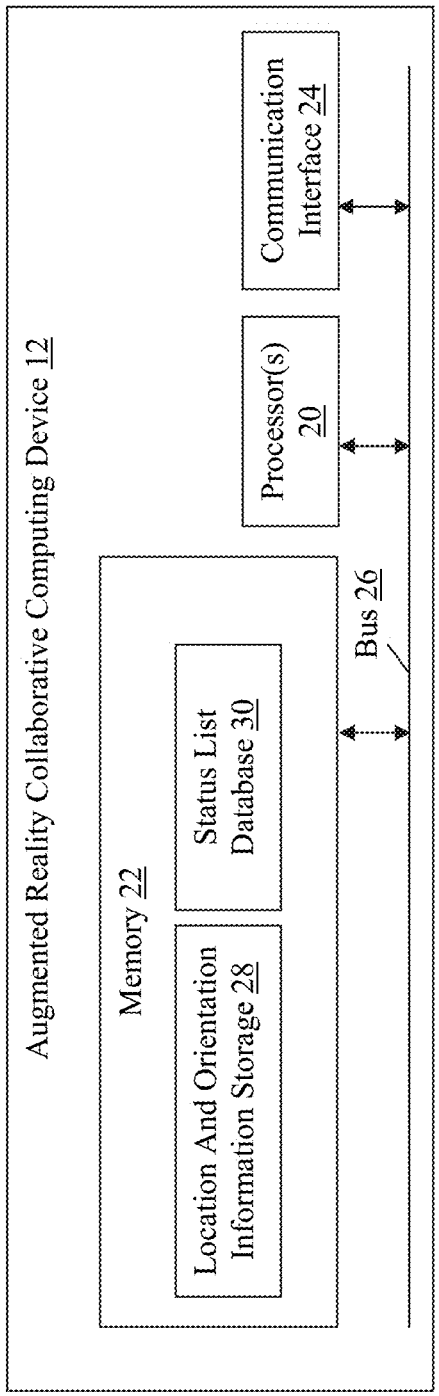
FIG. 2A is a block diagram of an example of the augmented reality collaborative computing device shown in FIG. 1.

Referring more specifically to FIGS. 1 and 2A, the augmented reality collaborative computing apparatus 12 may perform any number of functions including generating a 3D object model in an AR environment for simultaneous viewing and manipulation, accelerating network traffic associated with web applications hosted by the server devices 16(1)-16(n). The augmented reality collaborative computing apparatus 12 includes one or more processors 20, a memory 22, and/or a communication interface 24, which are coupled together by a bus or other communication link 26, although the augmented reality collaborative computing apparatus 12 can include other types and/or numbers of elements in other configurations.

The processor(s) 20 of the augmented reality collaborative computing apparatus 12 may execute programmed instructions stored in the memory of the augmented reality collaborative computing apparatus 12 for the any number of the functions identified above. The processor(s) 20 of the augmented reality collaborative computing apparatus 12 may include one or more CPUs or general purpose processors with one or more processing cores, for example, although other types of processor(s) can also be used.

The memory 22 of the augmented reality collaborative computing apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 22.

Figure 3A:
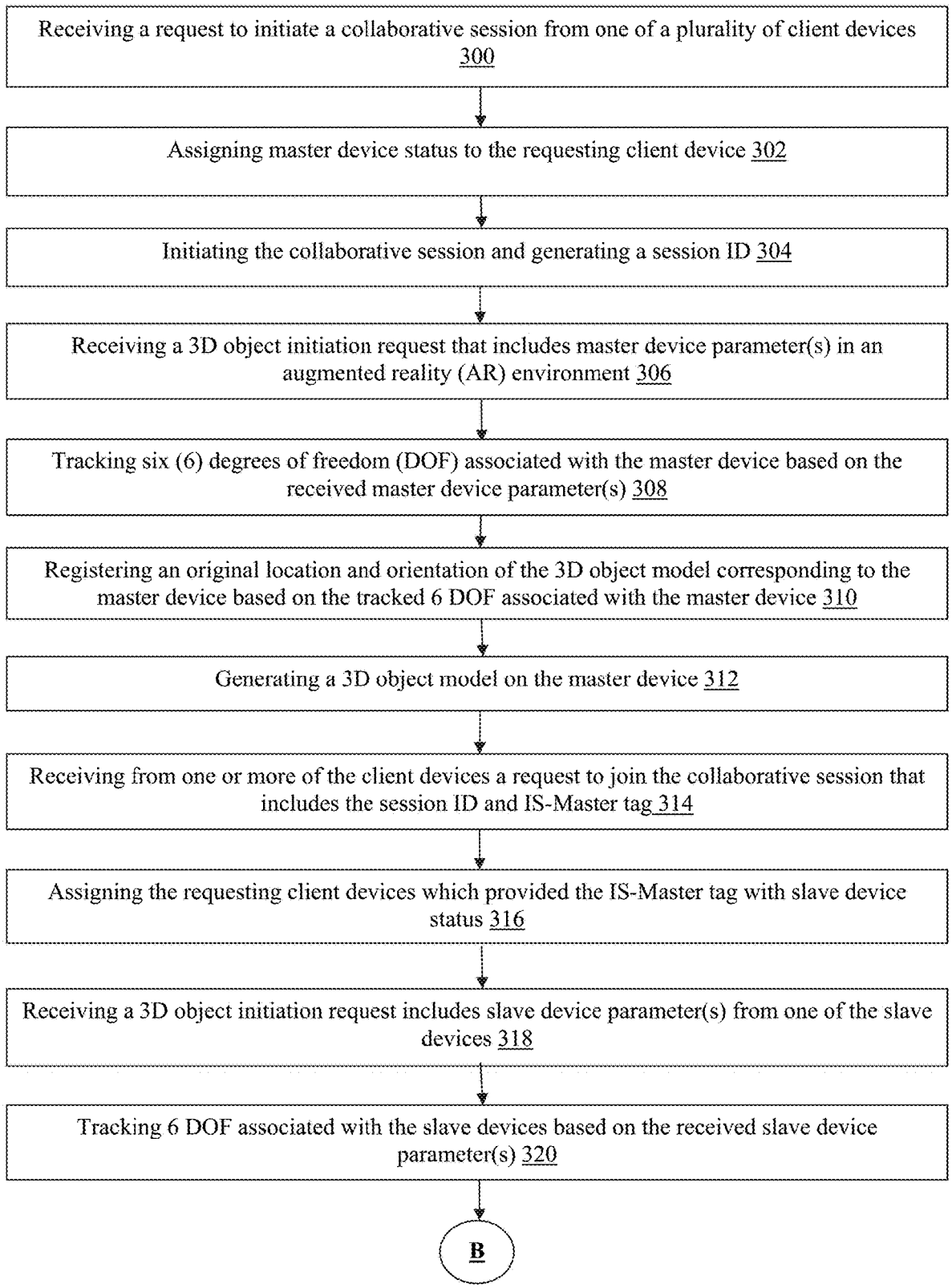
FIGS. 3A and 3B are a flow chart of an example of a method for managing a collaborative session for visualizing and interacting with a three-dimensional object in a collaborative augmented reality environment between a plurality of computing devices.
Figure 3B:
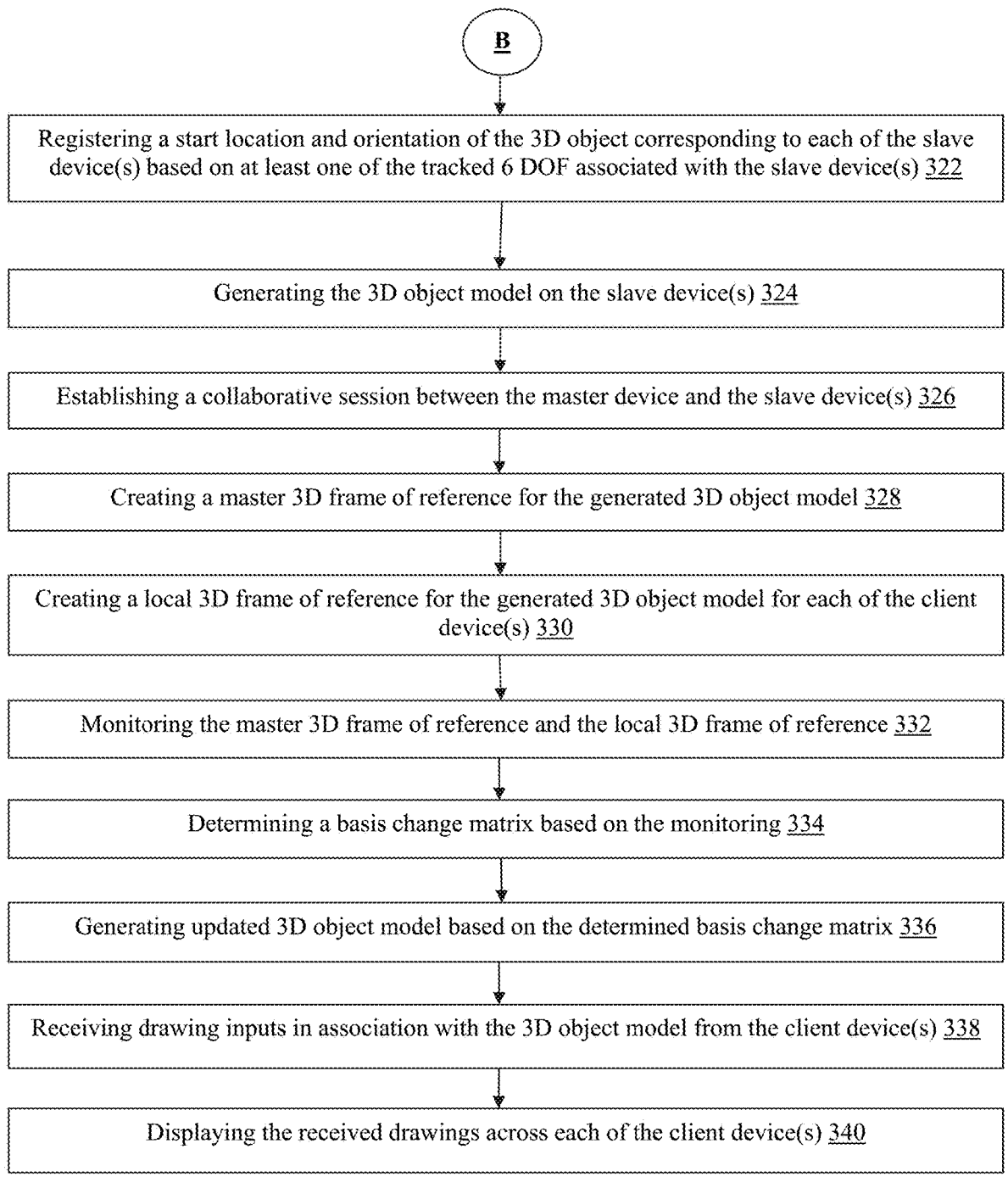
Figure 4:
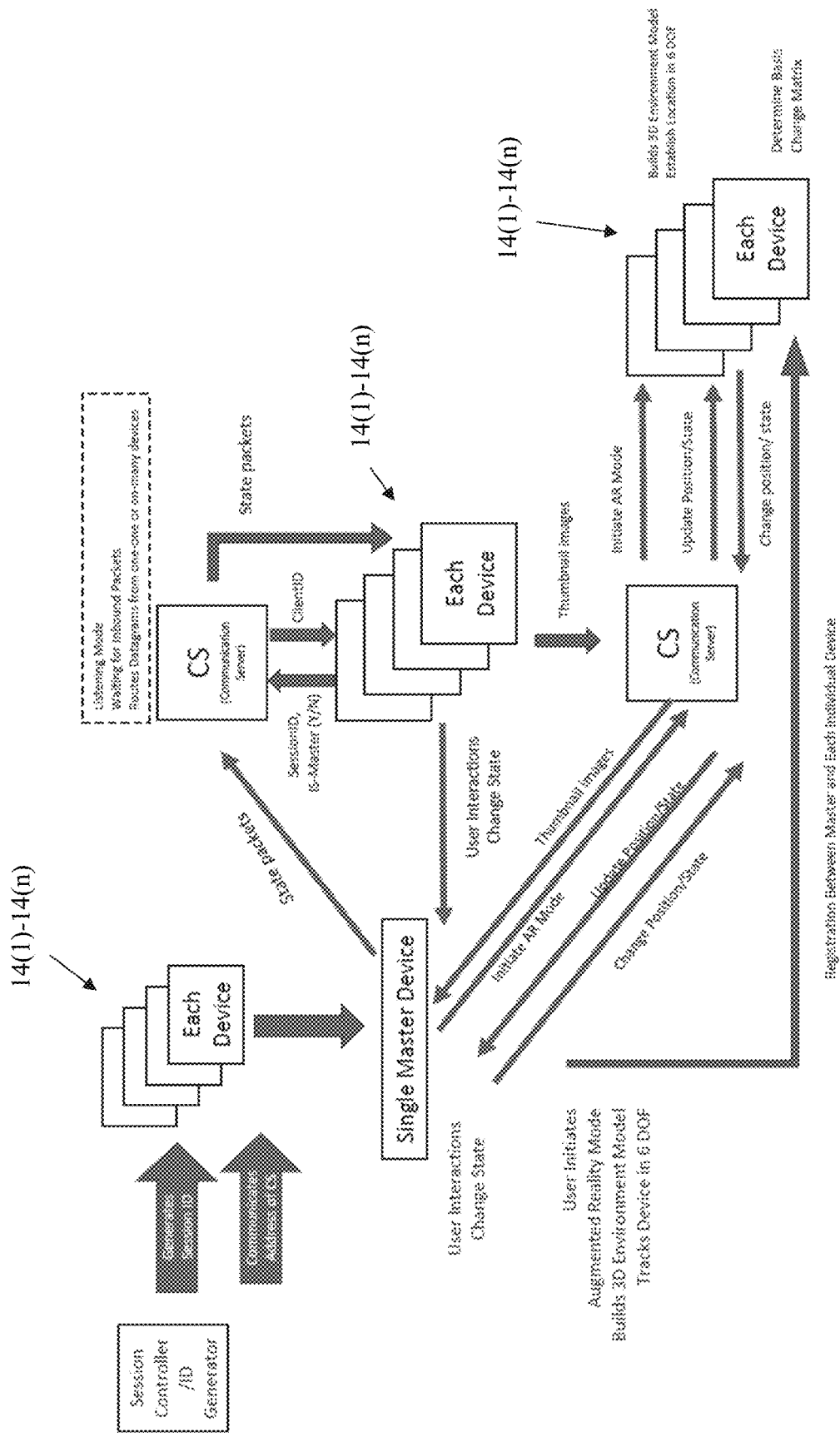
FIG. 4 is a functional block diagram of an example of managing a collaborative session for visualizing and interacting with a three-dimensional object in a collaborative augmented reality environment between a plurality of computing devices.

In this example, the memory 22 of the augmented reality collaborative computing apparatus 12 can store one or more applications that can include computer executable instructions that, when executed by the augmented reality collaborative computing apparatus 12, cause the augmented reality collaborative computing apparatus 12 to perform actions, such as to transmit, receive, or otherwise manage a collaborative session for visualizing and interacting with a three-dimensional object in a collaborative augmented reality environment with one or more of the client devices 14(1)-14(n), for example, and to perform other actions described and illustrated below with reference to FIGS. 3A, 3B and 4. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the augmented reality collaborative computing apparatus 12 itself, may be located in virtual server(s) running in a cloud-based computing environment rather than being tied to one or more specific physical network computing devices. Also, the application(s) may be running in one or more virtual machines (VMs) executing on the augmented reality collaborative computing apparatus 12. Additionally, in one or more embodiments of this technology, virtual machine(s) running on the augmented reality collaborative computing apparatus 12 may be managed or supervised by a hypervisor.

In this particular example, the memory 22 of the augmented reality collaborative computing apparatus 12 includes location and orientation information storage 28 and a status list database 30, although the memory 22 can include other policies, modules, databases, or applications, for example. The orientation information storage 28 stores data on the location and orientation of the three dimensional object, although the storage may store other types of data. The status list database 30 stores data on the status of each of the client devices 14(1)-14(n) with respect to each collaborative session, although this database may store other types of data.

The communication interface 24 of the augmented reality collaborative computing apparatus 12 operatively couples and communicates between the augmented reality collaborative computing apparatus 12, the client devices 14(1)-14(n), and/or the server devices 16(1)-16(n), which are all coupled together by the communication network(s) 18, although other types and/or numbers of communication networks or systems with other types and/or numbers of connections and/or configurations to other devices and/or elements can also be used.

By way of example only, the communication network(s) 18 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 18 in this example can employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like. The communication network(s) 18 can also include direct connection(s) (e.g., for when a device illustrated in FIG. 1, such as the augmented reality collaborative computing apparatus 12, one or more of the client devices 14(1)-14(n), or one or more of the server devices 16(1)-16(n) operate as virtual instances on the same physical machine).

While the augmented reality collaborative computing apparatus 12 is illustrated in this example as including a single device, the augmented reality collaborative computing apparatus 12 in other examples can include a plurality of devices or blades each having one or more processors (each processor with one or more processing cores) that implement one or more steps or other aspects of this technology. In these examples, one or more of the devices can have a dedicated communication interface or memory. Alternatively, one or more of the devices can utilize the memory, communication interface, or other hardware or software components of one or more other devices included in the augmented reality collaborative computing apparatus 12.

Additionally, one or more of the devices that together comprise the augmented reality collaborative computing apparatus 12 in other examples can be standalone devices or integrated with one or more other devices or apparatuses, such as one of the server devices 16(1)-16(n), for example. Moreover, one or more of the devices of the augmented reality collaborative computing apparatus 12 in these examples can be in a same or a different communication network including one or more public, private, or cloud networks, for example.

Figure 2B:
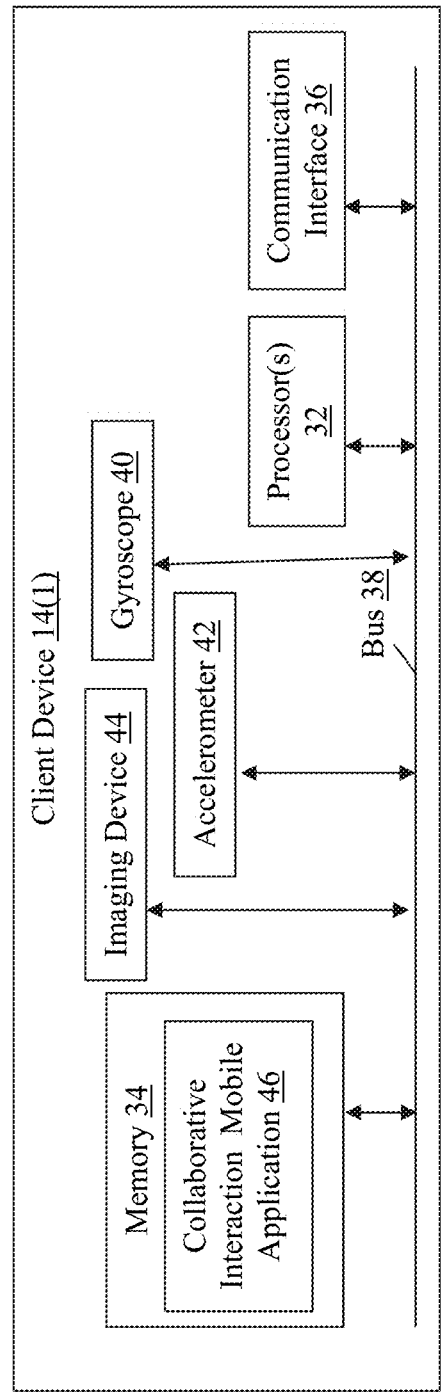
FIG. 2B is a block diagram of an example of one of the client devices shown in FIG. 1.

Referring to FIGS. 1 and 2B, each of the client devices 14(1)-14(n) of the collaborative interaction computing system 10 in this example include any type of computing device that can participate in a collaborative session for visualizing and interacting with a three-dimensional object in a collaborative augmented reality environment, such as mobile computing devices, desktop computing devices, laptop computing devices, tablet computing devices, virtual machines (including cloud-based computers), or the like. In this example, since each of the client devices 14(1)-14(n) have the same structure and operation one example of the client device 14(1) is provided in FIG. 2B, although other types of computing devices with other elements may be used. In this example, the client device 14(1) include a processor 32, a memory 34, a communication interface 36, a gyroscope 40, an accelerometer 42, and an imaging device 44, which are coupled together by a bus or other communication link 38, types and/or numbers of systems, devices, components, or other elements in other configurations. The gyroscope 40 measures orientation and angular velocity of the client device 14(1), the accelerometer 42 measures changes in gravitational acceleration of the client device 14(1) that the accelerometer 42 is installed in, and the imaging device 44 may capture and/or provide images, such as a three dimensional image, although each may perform other types of functions or other operations. Additionally, in this example the memory 34 includes a collaborative interaction module application 46 which enables the client 14(1) to interact in the collaborative session as illustrated and described by way of the examples herein, although the memory 34 can include other policies, modules, databases, or applications, for example.

Each of the server devices 16(1)-16(n) of the collaborative interaction computing system 10 in this example includes one or more processors, a memory, and a communication interface, which are coupled together by a bus or other communication link, although other numbers and/or types of network devices could be used. The server devices 16(1)-16(n) in this example process requests received from the augmented reality collaborative computing apparatus 12 and/or the client devices 14(1)-14(n) via the communication network(s) 18. Various applications may be operating on the server devices 16(1)-16(n) and transmitting data (e.g., files or Web pages) to the augmented reality collaborative computing apparatus 12 and/or the client devices 14(1)-14(n). The server devices 16(1)-16(n) may be hardware or software or may represent a system with multiple servers in a pool, which may include internal or external networks.

Although the server devices 16(1)-16(n) are illustrated as single devices, one or more actions of each of the server devices 16(1)-16(n) may be distributed across one or more distinct network computing devices that together comprise one or more of the server devices 16(1)-16(n). Moreover, the server devices 16(1)-16(n) are not limited to a particular configuration. Thus, the server devices 16(1)-16(n) may contain a plurality of network computing devices that operate using a master/slave approach, whereby one of the network computing devices of the server devices 16(1)-16(n) operate to manage and/or otherwise coordinate operations of the other network computing devices. The server devices 16(1)-16(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 16(1)-16(n) can operate within the augmented reality collaborative computing apparatus 12 itself rather than as a stand-alone server device communicating with the augmented reality collaborative computing apparatus 12 via the communication network(s) 18. In this example, the one or more server devices 16(1)-16(n) may operate within the memory of the augmented reality collaborative computing apparatus 12.

Although the exemplary collaborative interaction computing system 10 with the augmented reality collaborative computing apparatus 12, client devices 14(1)-14(n), server devices 16(1)-16(n) and communication network(s) 18 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the collaborative interaction computing system 10, such as the augmented reality collaborative interaction computing device 12, client devices 14(1)-14(n), or server devices 16(1)-16(n), for example, may be configured to operate as virtual instances on the same physical machine. In other words, one or more of the augmented reality collaborative computing apparatus 12, client devices 14(1)-14(n), or server devices 16(1)-16(n) may operate on the same physical device rather than as separate devices communicating through communication network(s) 18. Additionally, there may be more or fewer augmented reality collaborative computing apparatus 12, client devices 14(1)-14(n), or server devices 16(1)-16(n)

than illustrated in FIG. 1. The client devices 14(1)-14(n) could also be implemented as applications on the augmented reality collaborative computing apparatus 12 itself as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of visualizing and interacting with digital objects in a collaborative augmented reality environment will now be described with reference to FIGS. 1-4. Referring more specifically to FIGS. 3A-3B and 4, in step 300 the augmented reality collaborative computing apparatus 12 may receive a request to initiate a collaborative session in a collaborative augmented reality environment from one of a plurality of client devices 14(1)-14(n). In this example, the user of one of the plurality of client devices 14(1)-14(n) may open a collaborative interaction mobile application 46 installed on the one of the plurality of client devices 14(1)-14(n) and each may activate registration via the collaborative interaction mobile application 46, although manners for initiating a collaborative session may be used. The request to initiate a collaborative session may, for example, comprise a request for a collaborative session to discuss features and/or specifications of an object, such as a new laptop computing device that is being launched, as part of a conference in a meeting room with one or more other participants at one or more of the other client devices 14(1)-14(n). In another example, the request for the collaborative session may be for one or more of the client devices 14(1)-14(n) which are at different geographic area(s).

In step 302, the augmented reality collaborative computing apparatus 12 may assign a master device status to the one of the plurality of client devices 14(1)-14(n) that made the initial request to initiate the collaborative session, although other approaches for assigning a master device status to one of the plurality of client devices 14(1)-14(n) may be used. The augmented reality collaborative computing apparatus 12 updates a status list database 30 with the one of the plurality of client devices 14(1)-14(n) with the master device status and the other ones of the client devices 14(1)-14(n) that are participating with slave device status, although statuses may be determined and maintained in other manners.

In step 304, in response to receiving the request to initiate the collaborative session, the augmented reality collaborative computing apparatus 12 may generate and allocate a session ID. The generated session ID is unique to the request and may be stored in memory 22 in the augmented reality computing apparatus 12, although the session ID may be stored at other locations.

In step 306, the augmented reality collaborative computing apparatus 12 may receive a 3D object initiation request from the one of the plurality of client devices 14(1)-14(n) with the master device status in an augmented reality (AR) environment. This received 3D object initiation request may include one or more master device parameters, such as real-time camera images from imaging device 44, accelerometer readings from the accelerometer 42, and gyroscope readings from the gyroscope 40 of the one of the plurality of client devices 14(1)-14(n) with the master device status, although other types and/or numbers of other parameters may be used.

In step 308, the augmented reality collaborative computing apparatus 12 may determine and track six (6) degrees of freedom (DOF) associated with the one of the plurality of client devices 14(1)-14(n) with the master device status based on the one or more received master device parameters, although other manners for tracking and/or other numbers of changes in positions may be used. The tracked 6 DOF refer to any change in position forward, backward, upward, downward, left and right across three perpendicular axes of the one of the plurality of client devices 14(1)-14(n) with the master device status. In this example, the accelerometer readings from the accelerometer 42 and gyroscope readings from the gyroscope 40 of the one of the plurality of client devices 14(1)-14(n) with the master device status are used by the augmented reality collaborative computing apparatus 12 to track the 6 DOF for the one of the plurality of client devices 14(1)-14(n) with the master device status.

In step 310, the augmented reality collaborative computing apparatus 12 may calibrate and store an original location and orientation for a 3D object model of an object in the collaborative augmented reality environment in the collaborative session based on the tracked 6 DOF associated with the one of the plurality of client devices 14(1)-14(n) with the master device status.

In step 312, the augmented reality collaborative computing apparatus 12 may generate or otherwise obtain the 3D object model, such as the laptop in this example, for use in the collaborative augmented reality environment in the collaborative session. In this example, the augmented reality collaborative computing apparatus 12 may generate or otherwise obtain the 3D object model in response to the request to initiate the collaborative session which may contain information about the object for the 3D object model, although other manners for generating the 3D object model may be used.

In step 314, the augmented reality collaborative computing apparatus 12 may receive from one or more of the other client devices 14(1)-14(n) a request to join the collaborative session. In this example, the request(s) from the one or more of the other client devices 14(1)-14(n) may be received in response to an email invitation sent to them from the one of the plurality of client devices 14(1)-14(n) with the master device status, although other manners obtaining the request to join the collaborative session may be used. Additionally, in this example the request may include information, such as a session ID and an IS-Master tag, although other types of information may be included. The received session ID in the request may be utilized by the to the augmented reality collaborative computing apparatus 12 to determine which of one or more collaborative sessions the one or more of the other client devices 14(1)-14(n) want to join. The IS-Master tag may be to indicate a current status, e.g. slave device status, of the one or more of the other client devices 14(1)-14(n) that transmitted the request to join the collaborative session.

In step 316, the augmented reality collaborative computing apparatus 12 may assign a status to each of the one or more of the other client devices 14(1)-14(n) that transmitted the request to join the collaborative session based on the received IS-Master tag in each received request, although other manners for assigning status may be used. In this example, when the received IS-Master tag indicates NO, then that one of the other client devices 14(1)-14(n) is assigned as a slave device and when the IS-Master tag indicates YES, then that one of the client devices 14(1)-14(n) is assigned as the master device. Once the status is assigned, the augmented reality collaborative computing apparatus 12 may update a status list database 30 that stores this status information for the one or more of the other client devices 14(1)-14(n) that transmitted the request to join the collaborative session.

In step 318, the augmented reality collaborative computing apparatus 12 may receive a 3D object initiation request with one or more slave device parameters from one or more of the client devices 14(1)-14(n) identified as the slave device(s). The one or more slave device parameters may include one or more real-time camera images from the imaging device 44, accelerometer readings from the accelerometer 42, and gyroscope readings from the gyroscope 40 from each of the one or more of the client devices 14(1)-14(n) assigned as the slave device(s), although other types and/or numbers of parameters may be provided.

In this example, when the one or more of the client devices 14(1)-14(n) identified as the slave device(s) are in the same room as the conference as the one of the plurality of client devices 14(1)-14(n) with the master device status for the collaborative session, then the one or more of the client devices 14(1)-14(n) identified as the slave device(s) may be prompted by the collaborative interaction mobile application 46 or in other manners, such as by the augmented reality collaborative computing apparatus 12, to place the one or more of the client devices 14(1)-14(n) identified as the slave device(s) at the same location and orientation as the one of the plurality of client devices 14(1)-14(n) with the master device status. Once the one or more of the client devices 14(1)-14(n) identified as the slave device(s) are in the same location and orientation as the one of the plurality of client devices 14(1)-14(n) with the master device status a confirmation notice or other indication may be sent, then the one or more of the client devices 14(1)-14(n) identified as the slave device(s) may be prompted by the collaborative interaction mobile application 46 or in other manners, such as by the augmented reality collaborative computing apparatus 12, to provide the one or more slave device parameters.

In another example, when the one or more of the client devices 14(1)-14(n) identified as the slave device(s) are not in the same room as the one of the plurality of client devices 14(1)-14(n) with the master device status for the collaborative session, then the one or more of the client devices 14(1)-14(n) identified as the slave device(s) may be prompted by the collaborative interaction mobile application 46 or in other manners, such as by the augmented reality collaborative computing apparatus 12, to establish a rough correlation with provided or otherwise obtained location and orientation of the one of the plurality of client devices 14(1)-14(n) with the master device status. In this example, the rough correlation may be established by prompting by the collaborative interaction mobile application 46 or in other manners, such as by the augmented reality collaborative computing apparatus 12, the one or more of the client devices 14(1)-14(n) identified as the slave device(s) at a different geographic locations with one or more directions to point of the client devices 14(1)-14(n) identified as the slave device(s) at a location and orientation as close as possible to the same location and orientation as the one of the plurality of client devices 14(1)-14(n) with the master device status, such as to within a stored threshold range of the same location and orientation by way of example only. Once the one or more of the client devices 14(1)-14(n) identified as the slave device(s) are roughly in the same location and orientation as the one of the plurality of client devices 14(1)-14(n) with the master device, such as to within a stored threshold range of the same location and orientation by way of example only, a status a confirmation notice or other indication may be sent, then each of the one or more of the client devices 14(1)-14(n) identified as the slave device(s) may be prompted by the collaborative interaction mobile application 46 or in other manners, such as by the augmented reality collaborative computing apparatus 12, to provide the one or more slave device parameters, although other manners for tracking one or more of the one or more of the client devices 14(1)-14(n) identified as the slave device(s) may be used.

In step 320, the augmented reality collaborative computing apparatus 12, may track 6 DOF associated each of the one or more of the client devices 14(1)-14(n) identified as the slave device(s) based on the received slave device parameters from each of the client devices 14(1)-14(n) identified as the slave device(s), although again other manners for tracking may be used. In this example, the 6 DOF again refers to change in position of forward, backward, upward, downward, left and right across three perpendicular axes, although other manners for tracking and/or other numbers of changes in positions may be used. In this example, the accelerometer readings from the accelerometer 42 and gyroscope readings from the gyroscope 40 of the client devices 14(1)-14(n) identified as the slave device(s) are used by the augmented reality collaborative computing apparatus 12 to track the 6 DOF for the client devices 14(1)-14(n) identified as the slave device(s).

In step 322, the augmented reality collaborative computing apparatus 12 may determine and register a start location of the 3D object in the collaborative augmented reality environment in the collaborative session corresponding to each of the client devices 14(1)-14(n) identified as the slave device(s) based on at least the tracked 6 DOF associated with each of the client devices 14(1)-14(n) identified as the slave device(s).

In step 324, the augmented reality collaborative computing apparatus 12 may generate or otherwise obtain a 3D object model for each of the client devices 14(1)-14(n) identified as the slave device(s) which is calibrated to the determined start location of the 3D object in the collaborative augmented reality environment in the collaborative session. The 3D object model is for the object, in this example the laptop, in response to the request for the collaborative session.

In step 326, the augmented reality collaborative computing apparatus 12 may establishes a collaborative session between the one of the plurality of client devices 14(1)-14(n) with the master device status and the client devices 14(1)-14(n) identified as the slave device(s) with respect to the 3D object in the collaborative augmented reality environment.

In step 328, the augmented reality collaborative computing apparatus 12 may create a master 3D frame of reference for the generated 3D object model in the collaborative augmented reality environment in the collaborative session based on the one of the plurality of client devices 14(1)-14(n) with the master device status. Any changes to orientation and/or location of the 3D object in response to an interaction by the one of the plurality of client devices 14(1)-14(n) with the master device status causes the augmented reality collaborative computing apparatus 12 to update the master 3D frame of reference for the generated 3D object model in the collaborative augmented reality environment in the collaborative session.

In step 330, the augmented reality collaborative computing apparatus 12 may create a local 3D frame of reference for the generated 3D object model in the collaborative augmented reality environment in the collaborative session for each of the client devices 14(1)-14(n) identified as the slave device(s) based on the master 3D frame of reference for the generated 3D object model in the collaborative augmented reality environment in the collaborative session and the 6 DOF associated with each of the client devices 14(1)-14(n) identified as the slave device(s).

In step 332, the augmented reality collaborative computing apparatus 12 may monitor continuously in real time the master 3D frame of reference and each of the local 3D frame of references. Any changes and/or alterations to the master 3D frame of reference for the generated 3D object model in the collaborative augmented reality environment in the collaborative session by the one of the plurality of client devices 14(1)-14(n) with the master device status. In this example, the master device status also may be transferred between the client devices 14(1)-14(n) in the collaborative session.

In step 334, the augmented reality collaborative computing apparatus 12 may determine a basis change matrix based on the monitoring, although other manners for monitoring and managing the detected changes may be used. In this example, the basis change matrix is a matrix that is generated based on the changes to the 6 DOF associated with each of the client devices 14(1)-14(n) in the collaborative session with reference to the master 3D frame of reference. Any changes to any of the local 3D frame of references causes the basis change matrix to be updated to result in updating of the master 3D frame of reference.

In step 336, the augmented reality collaborative computing apparatus 12 may generate an updated 3D object model for each of the client devices 14(1)-14(n) in the collaborative augmented reality environment in the collaborative session based on the determined basis change matrix. The augmented reality collaborative computing apparatus 12 may transmit the updated 3D object model to each of the client devices 14(1)-14(n) in the collaborative augmented reality environment in the collaborative session simultaneously and in real time in this example. Further, in this example each of the client devices 14(1)-14(n) in the collaborative augmented reality environment may view the transmitted updated 3D object model adjusted by the augmented reality collaborative computing apparatus 12 to a perspective view based on the current tracked 6 DOF in the determined basis change matrix for each of the client devices 14(1)-14(n) in the collaborative augmented reality environment in the collaborative session, although other manners for adjusting the particular view of the 3D object model of the one or more of the client devices 14(1)-14(n) in the collaborative augmented reality environment in the collaborative session may be used.

In step 338, the augmented reality collaborative computing apparatus 12 may receive an input, such as a drawing input by way of example, in association with the 3D object model from one of the client devices 14(1)-14(n) in the collaborative augmented reality environment in the collaborative session.

In step 340, the augmented reality collaborative computing apparatus 12 may transmit for display the received input on the displayed 3D object simultaneously to all of the client devices 14(1)-14(n) in real time seamlessly. Accordingly, this enhances the interaction among the client devices 14(1)-14(n) in the collaborative augmented reality environment in the collaborative session.

Accordingly, as illustrated providing methods, non-transitory computer readable medium and devices for visualizing and interacting with digital objects in a collaborative augmented reality environment. With this technology, multiple participants of a session collaboratively visualize and interact with digital three-dimensional (3D) versions of physical products in an augmented reality view of the same real-world space. Additionally, this technology advantageously provides an improved collaborative session where multiple participants can provide their input interactively in real time over a 3D object. Further, this technology provides multiple participants to understand how a product(s) would look like in that physical space, and to learn about any aspect of the product(s) related to functionality, service, maintenance, operation, and technical/business value while all of the people were collaboratively interacting with in an augmented reality environment. This technology further improves users understanding of new products as the collaboration allows for instruction and dialogue to better inform the users, and the interaction develops an intellectual and emotional connection to the learning process that results in better memory retention.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:
1. A method comprising:
establishing, by a computing apparatus, a collaborative session for visualizing and interacting with a three-dimensional object model generated by one of a plurality of computing devices in a collaborative augmented reality environment between the plurality of computing devices;
placing the other ones of the plurality of computing devices initially at a position and orientation corresponding to the one of the plurality of computing devices, when the other ones of the plurality of computing devices are confirmed to be at the position and orientation corresponding to the one of the plurality of computing devices, obtaining, by the computing apparatus, updated position and orientation information of each of the plurality of computing devices;

receiving, by the computing apparatus, an interaction instruction with respect to the three-dimensional object model generated by the one of the plurality of computing devices;

determining, by the computing apparatus, a basis change matrix based on the received interaction instruction and monitoring continuously in real time the three-dimensional object model generated by the one of the plurality of computing devices and each of the three-dimensional object models generated by the other of the plurality of computing devices; and determining and providing, by the computing apparatus, one or more instructions to adjust visualization of the three-dimensional object model generated by the one of the plurality of computing devices on each of the other three-dimensional object models generated on the other of the plurality of computing devices based on the determined basis change matrix and the updated position and orientation information of each of the plurality of computing devices.

2. The method of claim 1, further comprising:

receiving, by the computing apparatus, a join request from each of the plurality of computing devices, wherein the join request has an embedded master status indicator tag.

3. The method of claim 2, further comprising:

determining, by the computing apparatus, when one of the plurality of computing devices is a master device based on the embedded master status indicator tag; and registering, by the computing apparatus, the one of the plurality of computing devices as the master device when the determination indicates that the one of the plurality of computing devices is the master device.

4. The method of claim 1, further comprising:

receiving, by the computing apparatus, another interaction instruction with respect to the three-dimensional object model generated by the one of the plurality of computing devices from a second of the plurality of computing devices; and adjusting, by the computing apparatus, visualization of the three-dimensional object model generated by the one of the plurality of computing devices on each of the other of the plurality of computing devices based on the received interaction instruction and the obtained position and orientation information of each of the plurality of computing devices.

5. The method of claim 1, wherein the received interaction instruction comprises rotation of the three-dimensional object model generated by the one of the plurality of computing devices, manipulation of the three-dimensional object model generated by the one of the plurality of computing devices or drawing over the three-dimensional object model generated by the one of the plurality of computing devices.

6. The method of claim 1, wherein the obtaining position and orientation information of each of the plurality of computing devices further comprises:

tracking, by the computing apparatus, six degrees of freedom of each of the plurality of computing devices; and determining, by the computing apparatus, position and orientation information associated with each of the plurality of computing devices based on the tracking.

7. A computing device, comprising memory comprising programmed instructions stored thereon and one or more processors configured to be capable of executing the stored programmed instructions to:

establish a collaborative session for visualizing and interacting with a three-dimensional object model generated by one of a plurality of computing devices in a collaborative augmented reality environment between the plurality of computing devices;

place the other ones of the plurality of computing devices initially at a position and orientation corresponding to the one of the plurality of computing devices, when the other ones of the plurality of computing devices are confirmed to be at the position and orientation corresponding to the one of the plurality of computing devices, obtain updated position and orientation information of each of the plurality of computing devices;

receive an interaction instruction with respect to the three-dimensional object model generated by the one of the plurality of computing devices;

determine a basis change matrix based on the received interaction instruction and monitoring continuously in real time the three-dimensional object model generated by the one of the plurality of computing devices and each of the three-dimensional object models generated by the other of the plurality of computing devices; and determine and provide one or more instructions to adjust visualization of the three-dimensional object model generated by the one of the plurality of computing devices on each of the other three-dimensional object models generated on the other of the plurality of computing devices based on the determined basis change matrix and the updated position and orientation information of each of the plurality of computing devices.

8. The computing device of claim 7, wherein the one or more processors are further configured to be capable of executing the stored programmed instructions to:

receive a join request from each of the plurality of computing devices, wherein the join request has an embedded master status indicator tag.

9. The computing device of claim 8, wherein the one or more processors are further configured to be capable of executing the stored programmed instructions to:

determine when one of the plurality of computing devices is a master device based on the embedded master status indicator tag; and register the one of the plurality of computing devices as the master device when the determination indicates that the one of the plurality of computing devices is the master device.

10. The computing device of claim 7, wherein the one or more processors are further configured to be capable of executing the stored programmed instructions to:

receive another interaction instruction with respect to the three-dimensional object model generated by the one of the plurality of computing devices from a second of the plurality of computing devices; and adjust visualization of the three-dimensional object model generated by the one of the plurality of computing devices on each of the other of the plurality of computing devices based on the received interaction instruction and the obtained position and orientation information of each of the plurality of computing devices.

11. The computing device of claim 7, wherein the received interaction instruction comprises rotation of the three-dimensional object model generated by the one of the plurality of computing devices, manipulation of the three-dimensional object model generated by the one of the plurality of computing devices or drawing over the three-dimensional object model generated by the one of the plurality of computing devices.

12. The computing device of claim 7, wherein the one or more processors are further configured to be capable of executing the stored programmed instructions to:
    track six degrees of freedom of each of the plurality of computing devices; and
    determine position and orientation information associated with each of the plurality of computing devices based on the tracking.

13. A non-transitory computer readable medium having stored thereon instructions comprising executable code which when executed by one or more processors, causes the one or more processors to:
    establish a collaborative session for visualizing and interacting with a three-dimensional object model generated by one of a plurality of computing devices in a collaborative augmented reality environment between the plurality of computing devices;
    place the other ones of the plurality of computing devices initially at a position and orientation corresponding to the one of the plurality of computing devices, when the other ones of the plurality of computing devices are confirmed to be at the position and orientation corresponding to the one of the plurality of computing devices, obtain updated position and orientation information of each of the plurality of computing devices;
    receive an interaction instruction with respect to the three-dimensional object model generated by the one of the plurality of computing devices;
    determine a basis change matrix based on the received interaction instruction and monitoring continuously in real time the three-dimensional object model generated by the one of the plurality of computing devices and each of the three-dimensional object models generated by the other of the plurality of computing devices; and
    determine and provide one or more instructions to adjust visualization of the three-dimensional object model generated by the one of the plurality of computing devices on each of the other three-dimensional object models generated on the other of the plurality of computing devices based on the determined basis change matrix and the updated position and orientation information of each of the plurality of computing devices.

14. The non-transitory computer readable medium of claim 13, wherein the executable code when executed by the one or more processors further causes the one or more processors to:
    receive a join request from each of the plurality of computing devices, wherein the join request has an embedded master status indicator tag.

15. The non-transitory computer readable medium of claim 14, wherein the executable code when executed by the one or more processors further causes the one or more processors to:
    determine when one of the plurality of computing devices is a master device based on the embedded master status indicator tag; and
    register the one of the plurality of computing devices as the master device when the determination indicates that the one of the plurality of computing devices is the master device.

16. The non-transitory computer readable medium of claim 13, wherein the executable code when executed by the one or more processors further causes the one or more processors to:
    receive another interaction instruction with respect to the three-dimensional object model generated by the one of the plurality of computing devices from a second of the plurality of computing devices; and
    adjust visualization of the three-dimensional object model generated by the one of the plurality of computing devices on each of the other of the plurality of computing devices based on the received interaction instruction and the obtained position and orientation information of each of the plurality of computing devices.

17. The non-transitory computer readable medium of claim 13, wherein the received interaction instruction comprises rotation of the three-dimensional object model generated by the one of the plurality of computing devices, manipulation of the three-dimensional object model generated by the one of the plurality of computing devices or drawing over the three-dimensional object model generated by the one of the plurality of computing devices.

18. The non-transitory computer readable medium of claim 13, wherein the executable code when executed by the one or more processors further causes the one or more processors to:
    track six degrees of freedom of each of the plurality of computing devices; and
    determine position and orientation information associated with each of the plurality of computing devices based on the tracking.

* * * * *